USOO9538871B2

United States Patent
Renkola (10) Patent No.: US 9,538,871 B2
(45) Date of Patent: Jan. 10, 2017

(54) RETAINER ARRANGEMENT

(71) Applicant: PIANTEK OY, Koskenkorva (FI)

(72) Inventor: Tapani Renkola, Ilmajoki (FI)

(73) Assignee: PIANTEK OY, Koskenkorva (FI)

( * ) Notice: Subject to any disclaimer, the term of this patent is extended or adjusted under 35 U.S.C. 154(b) by 13 days.

(21) Appl. No.: 14/468,829

(22) Filed: Aug. 26, 2014

(65) Prior Publication Data
US 2015/0060469 A1    Mar. 5, 2015

(30) Foreign Application Priority Data

Sep. 2, 2013 (FI) ..................................... 20135881

(51) Int. Cl.
| | | |
|---|---|---|
| *A47J 47/16* | (2006.01) | |
| *A47G 19/06* | (2006.01) | |
| *A47G 21/14* | (2006.01) | |
| *A47J 43/28* | (2006.01) | |

(52) U.S. Cl.
CPC .............. *A47G 19/06* (2013.01); *A47G 21/145* (2013.01); *A47J 43/287* (2013.01)

(58) Field of Classification Search
CPC ....... A47G 21/145; A47J 43/287; A47J 45/00; A47J 47/16
USPC ....... 220/574.1, 735; 248/37.6, 316.7, 213.2, 248/346.03, 37.3
See application file for complete search history.

(56) References Cited

U.S. PATENT DOCUMENTS

| | | | | |
|---|---|---|---|---|
| 46,692 A | * | 3/1865 | Morse .................... | A47G 21/14 131/257 |
| 83,538 A | * | 10/1868 | Patten .................... | A47G 21/14 131/257 |
| 178,112 A | * | 5/1876 | Byrkit .................. | A47G 21/145 211/86.01 |
| 277,304 A | * | 5/1883 | Maeder ................ | A47G 21/145 248/37.3 |

(Continued)

FOREIGN PATENT DOCUMENTS

| | | |
|---|---|---|
| CH | 268133 A | 5/1950 |
| DE | 38 05 542 A1 | 9/1988 |
| FI | 9909 | 12/2012 |

OTHER PUBLICATIONS

Mar. 2, 2015 Extended Search Report issued in European Application No. 14182136.3.

(Continued)

*Primary Examiner* — J Gregory Pickett
*Assistant Examiner* — Gideon Weinerth
(74) *Attorney, Agent, or Firm* — Oliff PLC (57) ABSTRACT

A retainer arrangement for arranging a serving utensil to a top edge protruding from a wall of a serving dish. The retainer arrangement comprises a support element having at least two holding partitions arranged substantially orthogonally to each other and configured to protrude from the support element and to be guidable below the top edge of the serving dish, a main surface of the support element arranged substantially parallel to a top surface of the top edge of the serving dish and configured to contact the top surface. The retainer arrangement also comprises a fastening element having at least one locking element configured to contact an inner surface of the wall of the serving dish, the fastening element protruding in relation to the top edge of the serving (Continued)

dish and configured to receive the serving utensil to be set on the retainer arrangement.

15 Claims, 12 Drawing Sheets

(56) References Cited

U.S. PATENT DOCUMENTS

| | | | | |
|---|---|---|---|---|
| D31,665 S * | 10/1899 | McKay | | 248/37.6 |
| 770,925 A * | 9/1904 | Pyle | | A47G 21/14 |
| | | | | 248/37.6 |
| 975,858 A * | 11/1910 | Guy | | A47G 21/14 |
| | | | | 248/229.16 |
| 1,125,585 A * | 1/1915 | Menger | | B65D 51/246 |
| | | | | 220/735 |
| 1,182,732 A | 5/1916 | Avery | | |
| 1,237,504 A * | 8/1917 | Graham | | A47G 21/145 |
| | | | | 248/213.2 |
| 1,292,980 A * | 1/1919 | Fry | | A47J 43/287 |
| | | | | 248/213.2 |
| 1,321,048 A * | 11/1919 | Johnson | | A47G 21/14 |
| | | | | 248/213.2 |
| 1,323,924 A * | 12/1919 | Stevens | | A47G 21/14 |
| | | | | 248/213.2 |
| 1,474,733 A * | 11/1923 | Richards | | A47J 43/287 |
| | | | | 131/257 |
| 1,577,510 A * | 3/1926 | Wyman | | A47J 43/287 |
| | | | | 248/37.3 |
| 1,622,058 A * | 3/1927 | Sohnle | | A47J 43/287 |
| | | | | 15/246 |
| 1,627,575 A * | 5/1927 | Rovelli | | A47J 43/287 |
| | | | | 16/110.1 |
| 1,717,556 A * | 6/1929 | Haese | | A47G 21/145 |
| | | | | 248/231.81 |
| 1,752,522 A * | 4/1930 | Eckelman | | A47G 21/145 |
| | | | | 248/229.16 |
| 1,769,803 A * | 7/1930 | Myers | | A47G 21/145 |
| | | | | 248/229.26 |
| 1,848,450 A * | 3/1932 | Williamson | | A47L 13/50 |
| | | | | 15/264 |
| 1,928,995 A * | 10/1933 | De Biasi | | A47J 36/12 |
| | | | | 220/735 |
| 2,034,940 A * | 3/1936 | Butler | | A47J 43/287 |
| | | | | 15/210.1 |
| 2,274,219 A * | 2/1942 | Seller | | A47G 21/145 |
| | | | | 24/3.9 |
| 2,368,898 A | 2/1945 | Swift, Jr. | | |
| 2,411,864 A * | 12/1946 | Birkin | | A47G 23/0225 |
| | | | | 206/501 |
| 2,530,470 A | 11/1950 | Kenly | | |
| 2,597,275 A * | 5/1952 | Ahlstrand | | A47G 21/145 |
| | | | | 131/257 |
| 2,647,523 A * | 8/1953 | Vollender, Jr. | | A24F 19/0035 |
| | | | | 131/257 |
| 2,739,465 A * | 3/1956 | Soderblom | | A47G 21/145 |
| | | | | 220/23.4 |
| 2,795,121 A * | 6/1957 | Pantello | | A47G 19/04 |
| | | | | 220/23.83 |
| 2,900,151 A | 8/1959 | Sims | | |
| 3,163,385 A * | 12/1964 | Lazan, Jr. | | A47J 47/16 |
| | | | | 24/336 |
| 3,542,209 A * | 11/1970 | Thompson | | B25H 3/003 |
| | | | | 211/70.6 |
| 3,542,236 A * | 11/1970 | Dru | | A47J 45/10 |
| | | | | 220/258.3 |
| 4,561,556 A * | 12/1985 | Bendix | | B44D 3/123 |
| | | | | 206/361 |
| 4,867,410 A * | 9/1989 | Jurgich | | A47G 21/14 |
| | | | | 211/70.7 |
| 4,961,555 A * | 10/1990 | Egan, Jr. | | A47G 23/0225 |
| | | | | 211/41.2 |
| 4,993,671 A * | 2/1991 | Ste. Marie | | A46B 17/02 |
| | | | | 211/65 |
| 5,105,963 A * | 4/1992 | Scott | | A47J 43/287 |
| | | | | 220/735 |
| 5,201,121 A * | 4/1993 | Heiberg | | A47J 43/287 |
| | | | | 30/123 |
| 5,687,873 A * | 11/1997 | Jones | | B44D 3/123 |
| | | | | 220/736 |
| 5,820,095 A * | 10/1998 | Stone | | B43K 23/002 |
| | | | | 211/69.1 |
| 5,853,157 A * | 12/1998 | O'Donnell | | B44D 3/123 |
| | | | | 211/65 |
| 6,398,063 B1 * | 6/2002 | Sternick | | A47G 21/145 |
| | | | | 211/70.7 |
| 6,419,194 B1 * | 7/2002 | LoSacco | | A46B 17/02 |
| | | | | 248/110 |
| 7,464,475 B2 * | 12/2008 | Tsao | | B65D 77/245 |
| | | | | 215/391 |
| 8,317,138 B1 * | 11/2012 | Johnson, Jr. | | A47G 21/145 |
| | | | | 206/349 |
| 8,695,838 B1 * | 4/2014 | Montgomery | | A47G 19/06 |
| | | | | 220/574.1 |
| 2005/0156085 A1 * | 7/2005 | Radovan | | A46B 17/02 |
| | | | | 248/110 |
| 2006/0175488 A1 * | 8/2006 | Schmiddem | | B44D 3/123 |
| | | | | 248/213.2 |
| 2008/0149634 A1 * | 6/2008 | Osborne | | A47G 21/145 |
| | | | | 220/23.83 |
| 2008/0283701 A1 * | 11/2008 | Kahn | | B25F 1/00 |
| | | | | 248/213.2 |
| 2012/0241575 A1 * | 9/2012 | Martinez Sanz | | F24J 2/05 |
| | | | | 248/231.81 |
| 2013/0175232 A1 * | 7/2013 | Barnes | | A47G 21/145 |
| | | | | 211/70.7 |
| 2014/0117179 A1 * | 5/2014 | Valls | | G09F 3/16 |
| | | | | 248/213.2 |
| 2014/0197186 A1 * | 7/2014 | Smith | | A47J 45/06 |
| | | | | 220/735 |
| 2015/0060469 A1 * | 3/2015 | Renkola | | A47G 21/145 |
| | | | | 220/574.1 |
| 2015/0108286 A1 * | 4/2015 | Barnes | | A47J 43/287 |
| | | | | 248/37.6 |
| 2015/0216364 A1 * | 8/2015 | Knight, Sr. | | A47J 47/16 |
| | | | | 248/37.6 |
| 2015/0359387 A1 * | 12/2015 | Ramirez | | A47J 43/287 |
| | | | | 374/141 |

OTHER PUBLICATIONS

Search Report issued in Finnish Application No. 20135881 dated Mar. 24, 2014 (with translation).

* cited by examiner

RETAINER ARRANGEMENT

TECHNICAL FIELD

This application relates to a retainer arrangement for arranging a serving utensil to a top edge protruding from a wall of a serving dish. This type of arrangement is useful in supporting various serving utensils, servers or other utensils used in serving a serving dish.

BACKGROUND

There are generally two types of problems related to serving dishes that have not been solved in a reliable manner so far. On one hand, the positioning of serving utensils in connection with the serving dish is difficult. When positioning a serving utensil in the actual serving dish, it usually slips into the product being served, and picking it up is both unhygienic and unpleasant. On the other hand, in situations with several serving dishes, there is a danger that one and the same serving utensil is used for the contents of different serving dishes. Normally, this does not have much of an impact, other than aesthetically speaking, as the contents of different serving dishes are mixed with each other. However, a considerable problem arises from the fact that the contents in different serving dishes with different allergens may also be mixed with each other. This may make consuming the food at least partly impossible to some of the people wishing to eat the food. In the worst case, this type of mixing of the contents may cause a severe and life-threatening allergic reaction to a person.

SUMMARY

It is thus an object of the disclosed embodiments to prevent the drawbacks related to known serving solutions and to provide a novel type of solution that can significantly improve dispensing from a serving dish.

Disclosed embodiments are based on the idea that a serving utensil supported by a retainer arrangement that is easy to arrange to a serving dish solves the above problems.

According to this disclosure, a 'serving utensil' refers to servers, ladles, and knives used when serving different ingredients, for example, to oneself or others, and also to other means utilised in serving, such as different instruction or product cards. In this connection, 'a serving dish' refers especially to a standard-sized GN dish system that is made mainly of plastic and stainless steel, but also of other materials suitable for serving foodstuffs. However, a serving dish can also be some other non-standard-sized dish or set of dishes that has an appropriate geometry.

The disclosed embodiments provide considerable advantages. Thus, this type of retainer arrangement can be set in both new serving dishes and serving dishes already in use.

All parts of the arrangement according to the disclosed embodiments can be manufactured in such a size range that no dangerous situations occur, even if a part of the retainer arrangement or an accessory thereof fell into the serving dish and ended up on a person's plate during dispensing.

All materials used in the manufacture of the retainer arrangement according to the disclosed embodiments can also be selected from materials approved for use with foodstuffs.

When making the retainer arrangement of a plastic mixture, it will preferably be antibacterial. A plastic mixture also endures well both cold and hot.

Other advantages provided by the disclosed embodiments are disclosed in the following detailed description of specific embodiments.

According to an embodiment, there is provided a retainer arrangement for arranging a serving utensil to a top edge protruding from a wall of a serving dish. The retainer arrangement comprises a support element having at least two holding protrusions arranged substantially orthogonally to each other and configured to protrude from the support surface and to be guidable below the top edge of the serving dish, a main surface of the support element arranged substantially parallel to a top surface of the top edge of the serving dish and configured to contact the top surface, and a fastening element having at least one locking element configured to contact an inner surface of the wall of the serving dish, the fastening element protruding in relation to the top edge of the serving dish and configured to receive the serving utensil to be set on the retainer arrangement.

BRIEF DESCRIPTION OF THE DRAWINGS

In the following, disclosed embodiments will be explained in more detail with reference to the accompanying drawing, in which.

DETAILED DESCRIPTION

Reference is made throughout to the figures, which are schematic and illustrate the general structure and operation of the preferred embodiments, but are not made to scale. The structural parts shown by reference numbers in the figures correspond to the structural parts marked by reference numbers in the disclosure.

Figure 10:
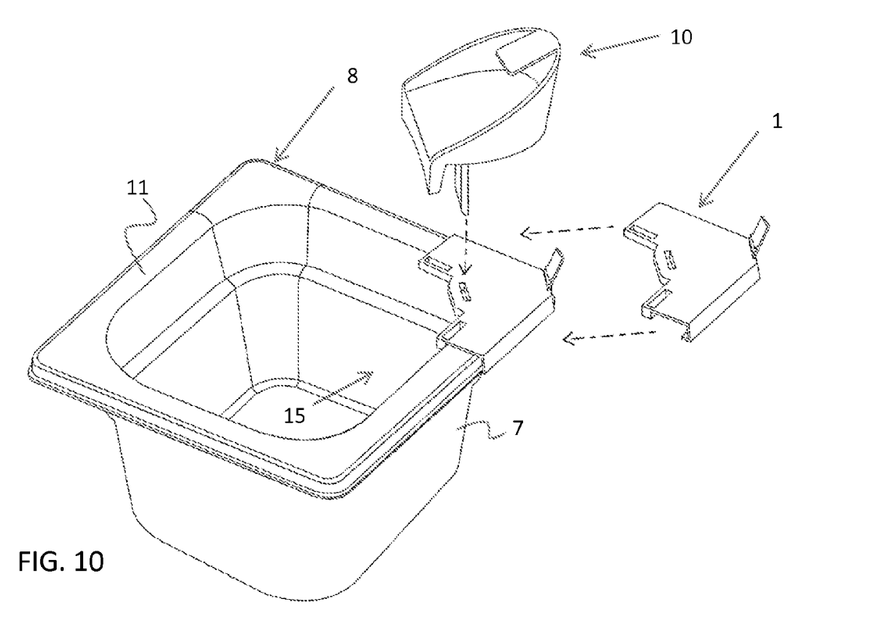
FIG. 10 shows how the combination of FIG. 6 is attached to a serving dish.

Thus, FIGS. 1 to 14 show the structure and operation of a first embodiment of the retainer arrangement 1. This type of retainer arrangement comprises a support surface 2 that is equipped with at least two holding means 3. The support surface is perforated by at least one mounting opening 4, to which a separate locking means 5 can be guided to lock the retainer arrangement to a top edge 8 protruding from a wall 7 of a serving dish 6 to which the arrangement is to be mounted in the manner shown in FIG. 10, for instance. This type of serving dish preferably belongs to a standard-sized so-called GN dish system, the likes of which are made mainly of plastic and stainless steel but also of other materials suitable for serving foodstuffs. However, said serving dish may also be some other suitable non-standard-sized serving dish or set with an appropriate structure.

Figure 41:
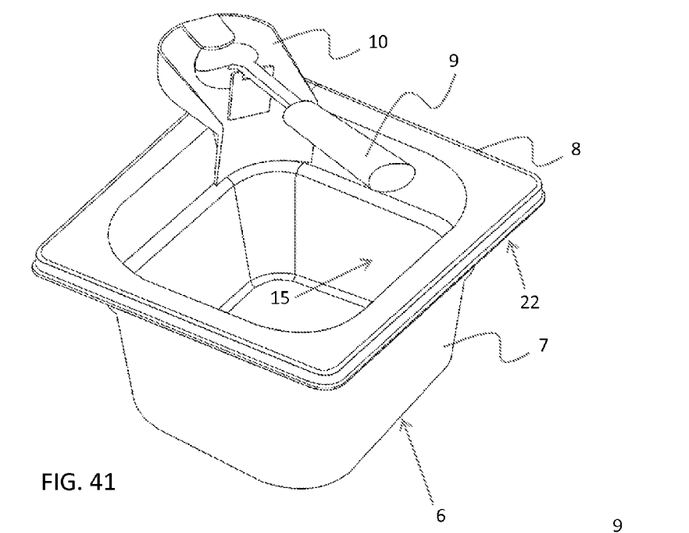
FIG. 41 shows an axonometric presentation of a retainer arrangement arranged to a serving dish with a fastening element and serving utensils set in it.
Figure 42:
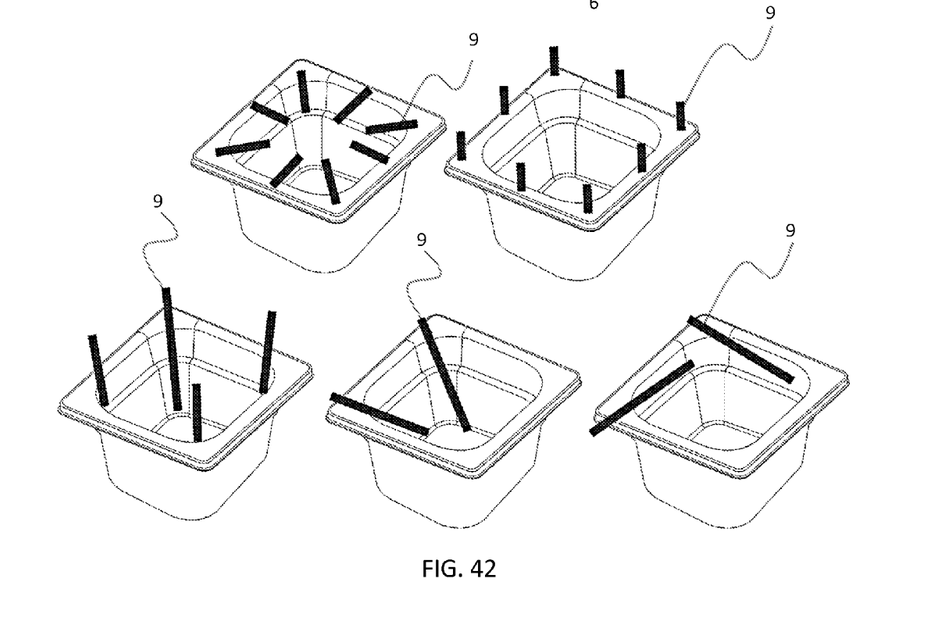
FIG. 42 shows examples of different positioning options of a serving utensil when using different fastening elements.

The retainer arrangement 1 is utilised in particular for setting different serving utensils 9 in the serving dish 6 or on its top edge 8; see FIGS. 41 and 42. FIG. 41 shows an example of this type of use, in which an ice cream scoop used as the serving utensil 9 has been set on the at least one fastening element 10 on the top edge of the serving dish. Serving utensils of this type may include different servers, ladles, and knives used when serving different ingredients to oneself or others, and also other means utilised in serving, such as different instruction or product cards.

Figure 13:
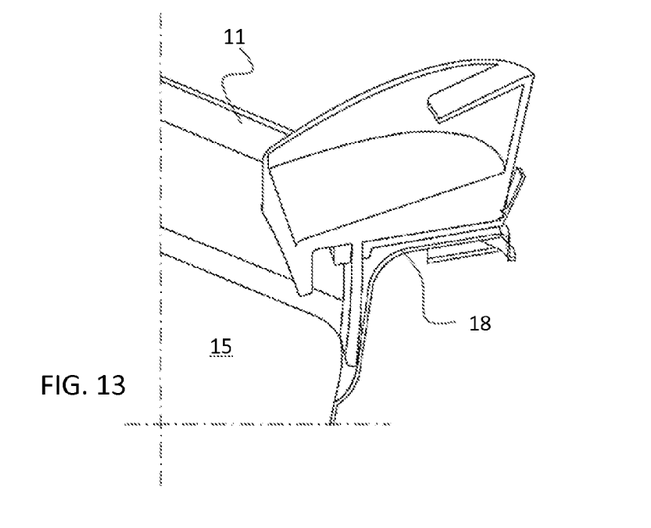
FIG. 13 shows the combination of FIG. 12 attached to the serving dish, as a cross-section from the corner of the serving dish.
Figure 14:
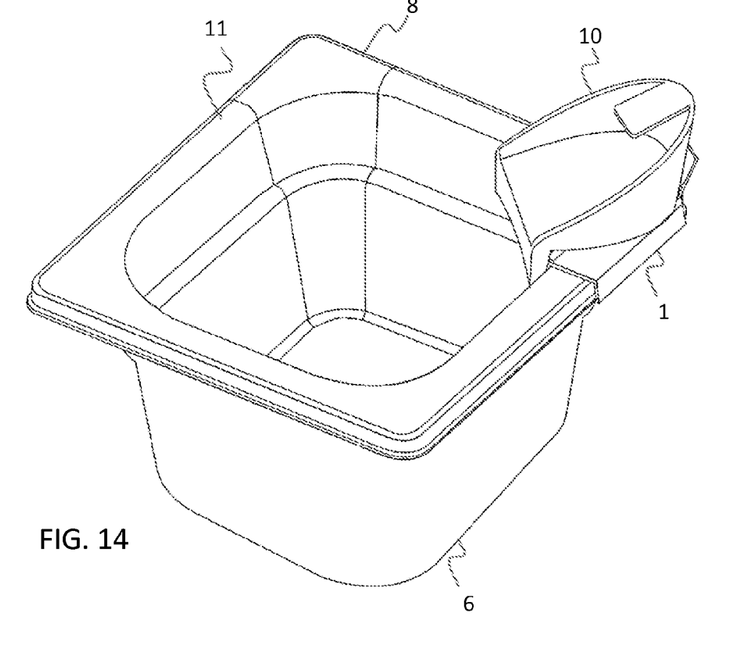
FIG. 14 shows the combination of FIG. 12 attached to the serving dish.

The support surface 2 on the retainer arrangement 1 is in its service position arranged to settle against a top surface 11 on the top edge 8 of the serving dish 6 to be substantially parallel thereto. At the same time, the holding means 3 protrude from the support surface to form two partitions that settle substantially orthogonally to each other and can be guided partly below the top edge of the serving dish in the manner illustrated in FIG. 11. For this purpose, the partitions are formed of a protrusion 12 extending substantially perpendicularly from the support surface. At the end opposite the support surface of the protrusion, there is at least one flange 13 that extends from the protrusion toward the serving dish receiving the retainer arrangement and is also substantially parallel to the support surface 2. The partitions remain preferably slightly apart from each other, whereby the retainer arrangement to be guided to the corner of the serving dish permits that the corner of the serving dish projects from the opening 14 between the partitions, The retainer arrangement 1 supported against the top surface 11 of the serving dish 6 and extending via flanges 13 below the top edge is positioned finally in place by means of the locking means 5 that is guided into the mounting opening 4 and interacts with the inner surface 15 in the wall 7 of the serving dish. The configuration of the structure is also shown in partial cutaway in FIGS. 12 and 13. The final serving utensil arranged to the serving dish is shown in FIG. 14.

Figure 1:
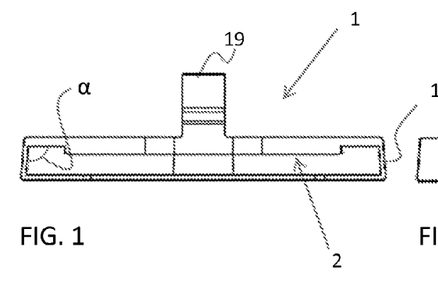
FIG. 1 shows a first embodiment of the retainer arrangement according to an embodiment from the front.
Figure 2:
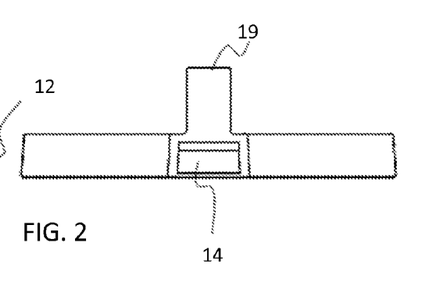
FIG. 2 shows the retainer arrangement of FIG. 1 from the back.
Figure 3:
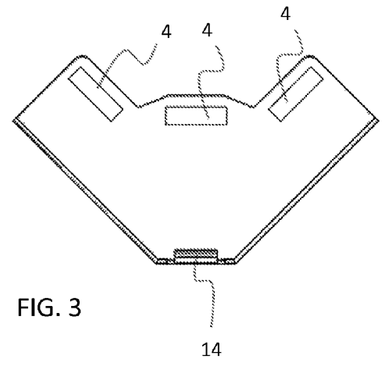
FIG. 3 shows the retainer arrangement of FIG. 1 from the top.
Figure 4:
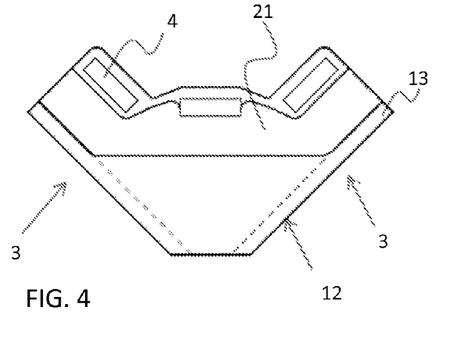
FIG. 4 shows the retainer arrangement of FIG. 1 from below.
Figure 5:
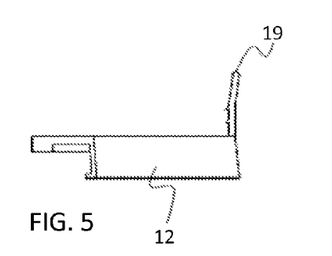
FIG. 5 shows the retainer arrangement of FIG. 1 from the side.
Figure 6:
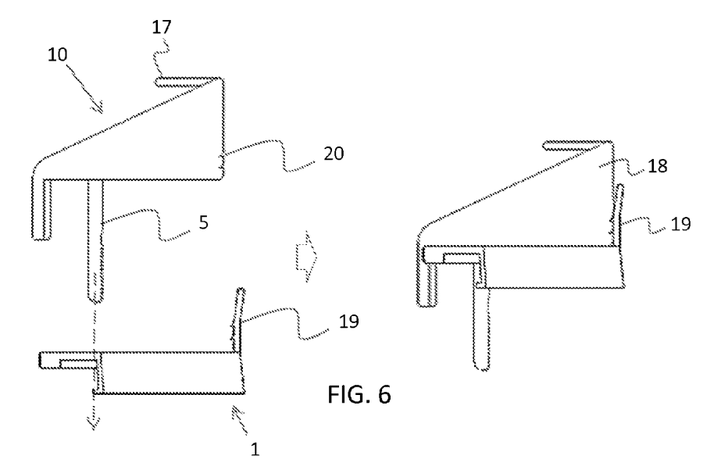
FIG. 6 shows how a fastening element is arranged to the retainer arrangement of FIG. 1.
Figure 7:
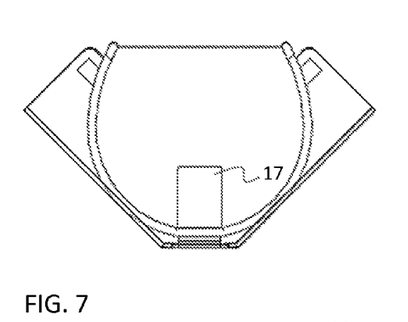
FIG. 7 shows the combination of FIG. 6 from the top.
Figure 8:
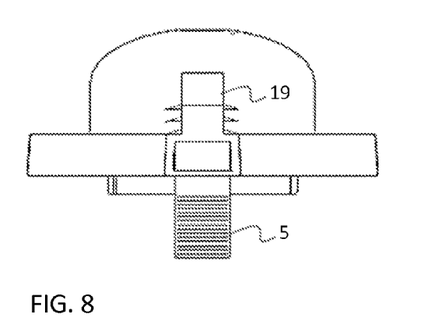
FIG. 8 shows the combination of FIG. 6 from the back.
Figure 9:
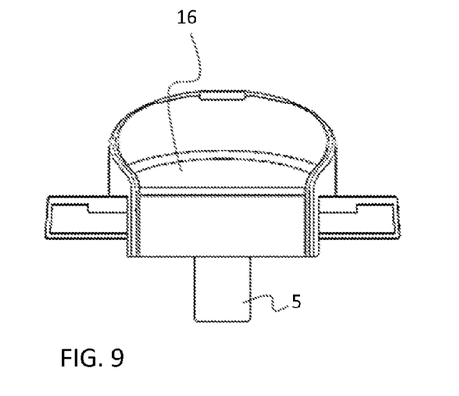
FIG. 9 shows the combination of FIG. 6 from the front.

In the embodiment according to FIGS. 1 to 14, the locking means 5 forms part of the fastening elements 10 of the retainer arrangement. One embodiment of the fastening element is shown in FIGS. 6 to 9, in which the elements receiving the serving utensil 9 comprise a bowl-like part 16 receiving a ladle and a holding part 17 protruding above it to keep the ladle in place. In a preferred embodiment, the position of this type of holding part in relation to a body 18 in the fastening element can be adjusted according to different ladle forms. In FIG. 6, an upright locking means 5 can be seen below the bowl-like part. As can be seen in FIG. 13, for example, the fastening elements are in their service position arranged to protrude above the serving dish in relation to its top edge while the locking means is arranged to extend inside the serving dish against its inner surface 15.

The fastening elements 10 settle on the base formed by the support surface 2 by means of mechanical attachment, for instance. The figures show, on one hand, the fastening provided by the locking means 5 and, on the other, the combined effect of a holder 19 protruding from the support surface and counter-elements 20, such as grooves, on the fastening element. See FIG. 6. As can be seen from FIG. 3, for example, the support surface may be perforated by several mounting openings 4. Thus, the fastening elements can also be equipped with several locking means. Alternatively, the position of the fastening element in relation to the support surface can be varied depending on which mounting opening the locking means on the fastening element is arranged in. The effect of these different positioning ways on the location of the serving utensil 9 in the serving dish is shown in FIG. 42.

Figure 11:
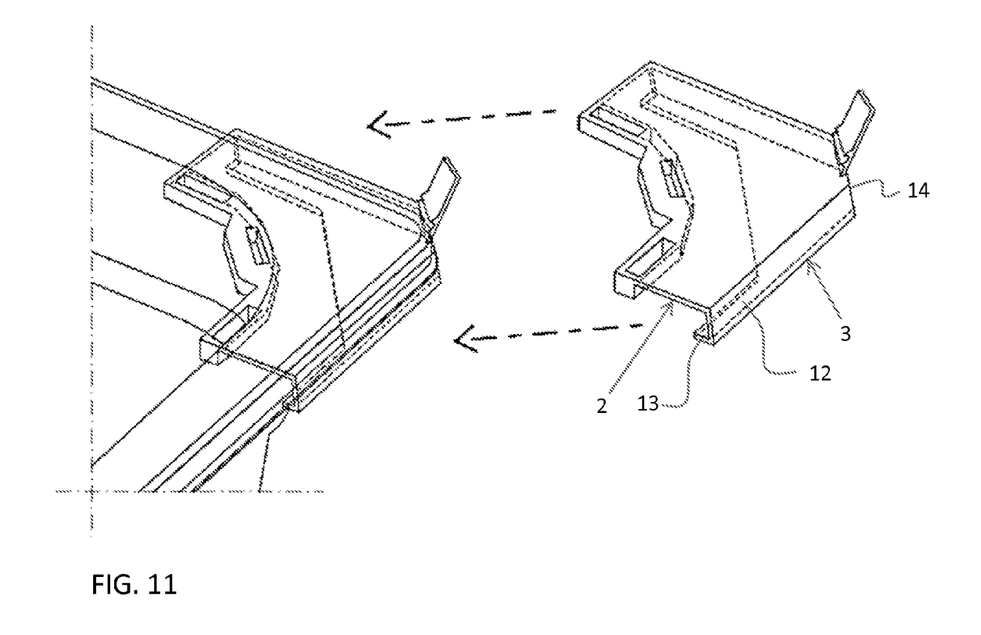
FIG. 11 shows a detail image of how the retainer arrangement of FIG. 1 is attached to a serving dish.
Figure 11A:
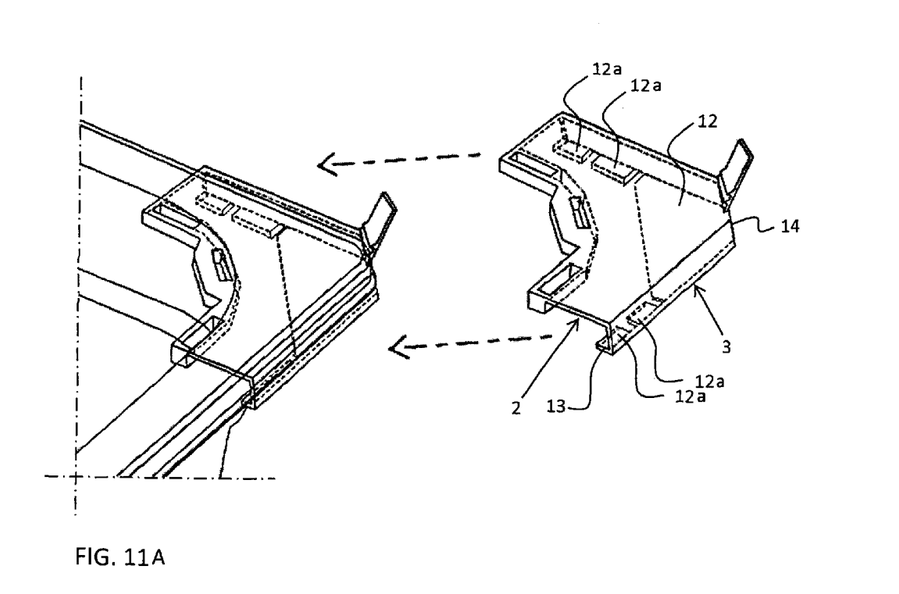
FIG. 11A shows another detail image of how the retainer arrangement of FIG. 1 is attached to a serving dish.
Figure 12:
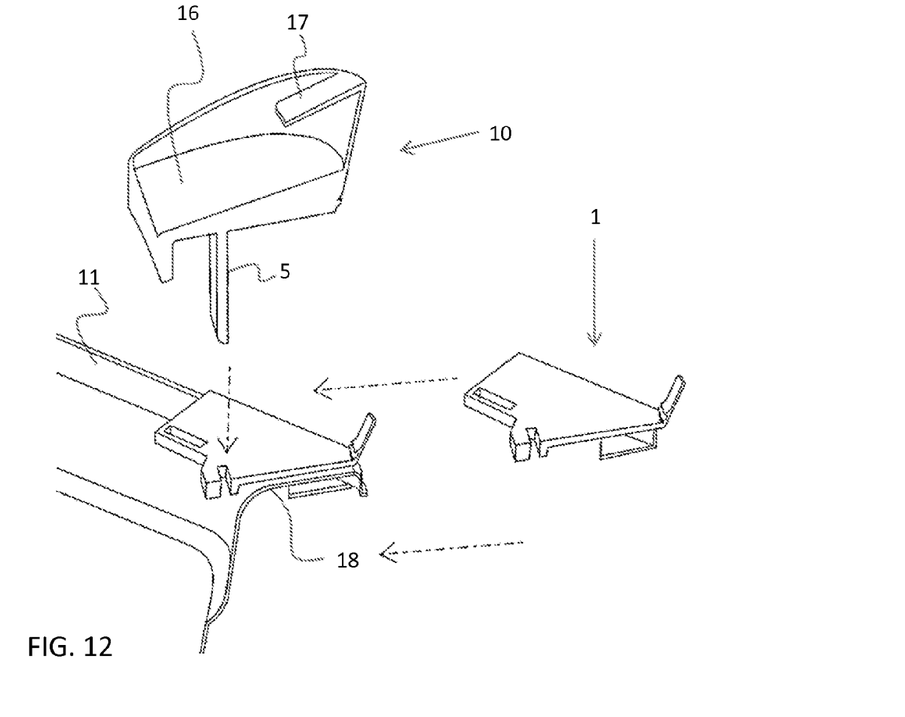
FIG. 12 shows how the combination of FIG. 6 is attached to the serving dish, as a cross-section from the corner of the serving dish.

In the embodiment of FIGS. 1 to 14, the flange 13 of the holding means is arranged to be substantially equal in length to the holding means. This may be seen in FIGS. 4 and 11, for instance. It is naturally also possible to design the flange to have multiple parts and form several claws or claw-like elements 12a that extend below the top edge of the serving dish receiving the retainer arrangement, as seen in FIG. 11A.

To facilitate the positioning of the retainer arrangement 1, the protrusion 12 of the holding means 3 should preferably be designed to form a slightly blunt angle α with the support surface 2. This type of angle is then preferably 90 to 110 degrees, see FIG. 1. A channel 21 receiving the top edge 8 of the serving dish 6 has also been arranged on the support surface in such a manner that this channel widens in the direction of the top edge and is narrower than the top edge on the section opposite the top edge. See FIGS. 1 and 9. When designed this way, the channel is arranged to provide a pressure effect against the top edge top surface 11 on the serving dish receiving the retainer arrangement. The pressure effect guides the retainer arrangement to rise up from the top surface 11 of the top edge 8, whereby a higher gripping friction directed to the bottom surface 22 of the top edge is provided in the flanges 13 of the holding means.

Figure 18:
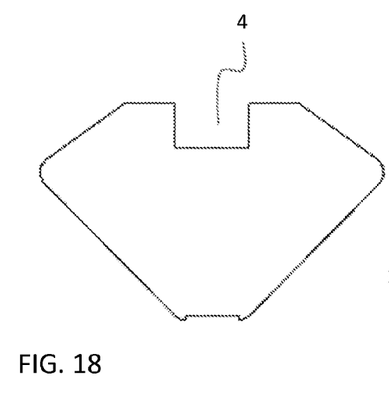
FIG. 18 shows the retainer arrangement of FIG. 15 from the top.
Figure 19:
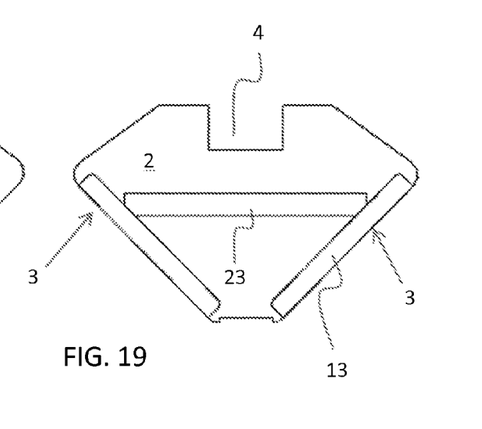
FIG. 19 shows the retainer arrangement of FIG. 15 from below.
Figure 20:
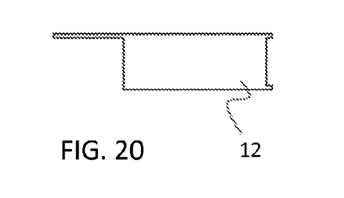
FIG. 20 shows the retainer arrangement of FIG. 15 from the side.
Figures 21, 22:
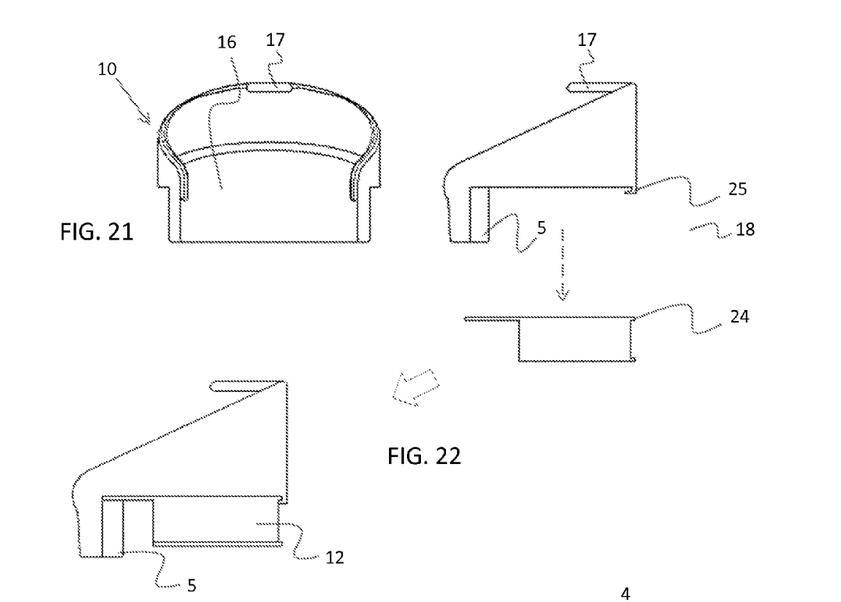
FIG. 21 shows a fastening element to be arranged to the retainer arrangement from the front.
FIG. 22 shows how the fastening element is arranged to the retainer arrangement of FIG. 13.
Figures 23, 24, 25:
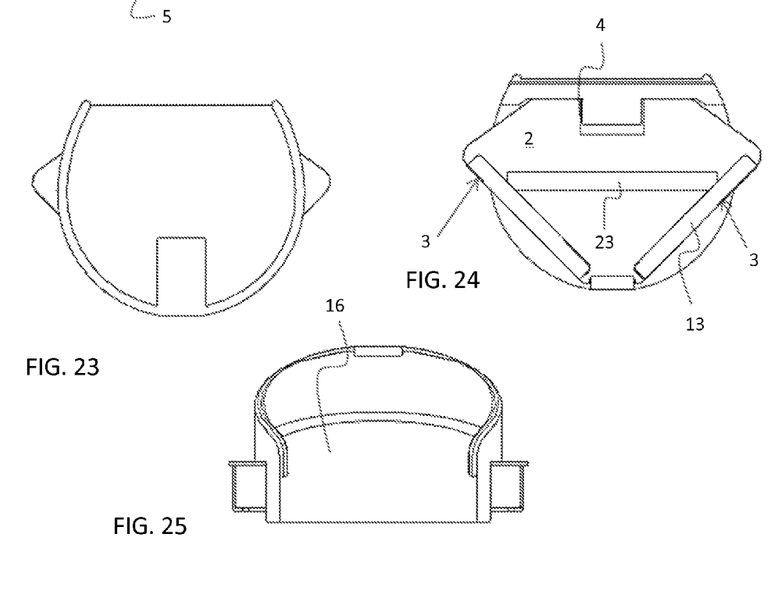
FIG. 23 shows the combination of FIG. 22 from the top.
FIG. 24 shows the combination of FIG. 22 from below.
FIG. 25 shows the combination of FIG. 22 from the front.
Figure 26:
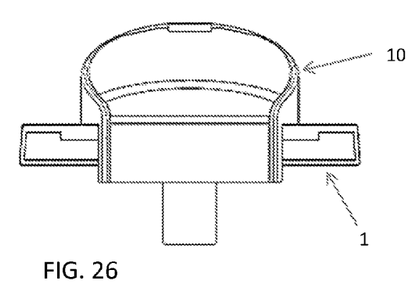
FIG. 26 shows a third embodiment of the retainer arrangement according to an embodiment from the front.
Figure 27:
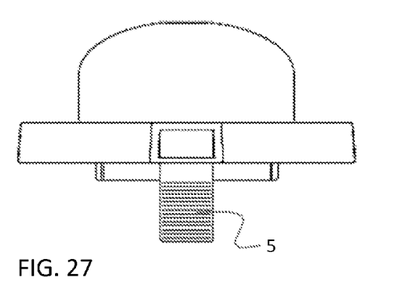
FIG. 27 shows the retainer arrangement of FIG. 26 from the back.
Figure 28:
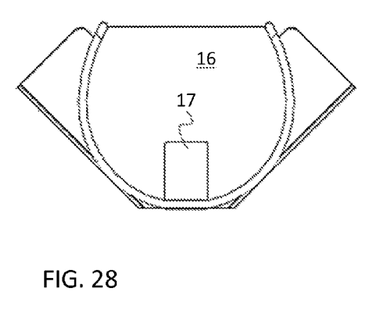
FIG. 28 shows the retainer arrangement of FIG. 26 from the top.
Figure 29:
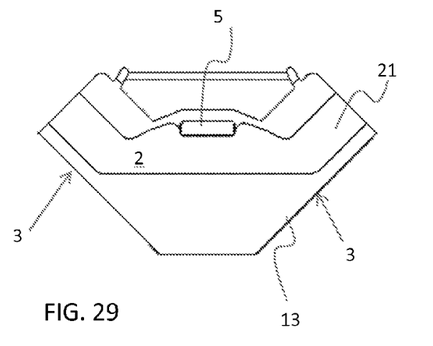
FIG. 29 shows the retainer arrangement of FIG. 26 from below.
Figure 30:
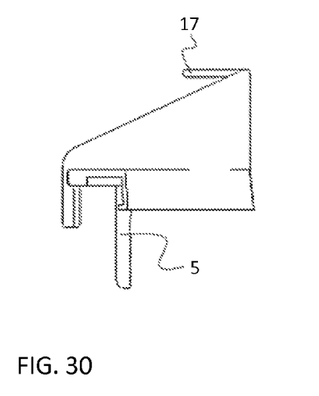
FIG. 30 shows the retainer arrangement of FIG. 26 from the side.
Figure 31:
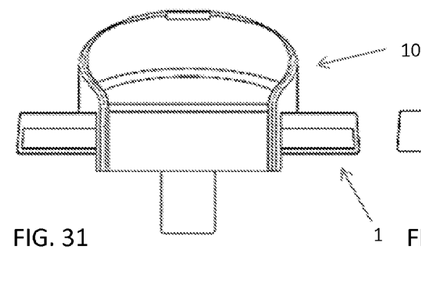
FIG. 31 shows a fourth embodiment of the retainer arrangement according to an embodiment from the front.
Figure 32:
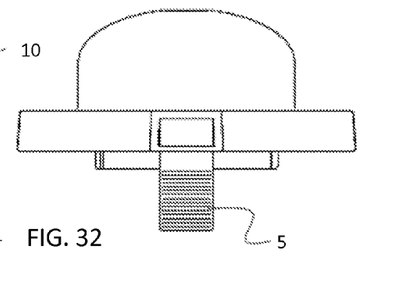
FIG. 32 shows the retainer arrangement of FIG. 31 from the back.
Figure 33:
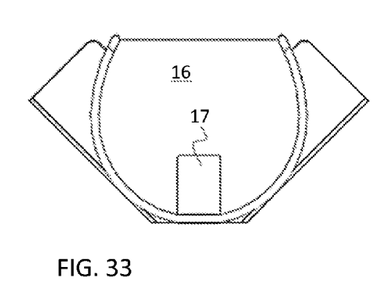
FIG. 33 shows the retainer arrangement of FIG. 31 from the top.
Figure 34:
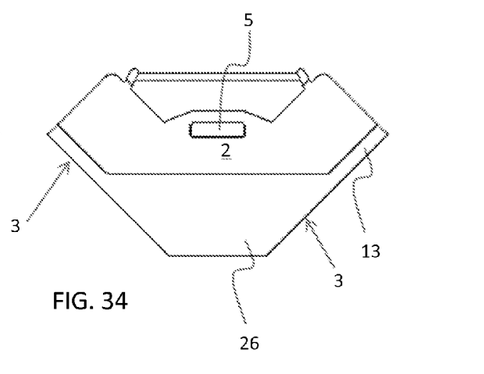
FIG. 34 shows the retainer arrangement of FIG. 31 from below.
Figure 35:
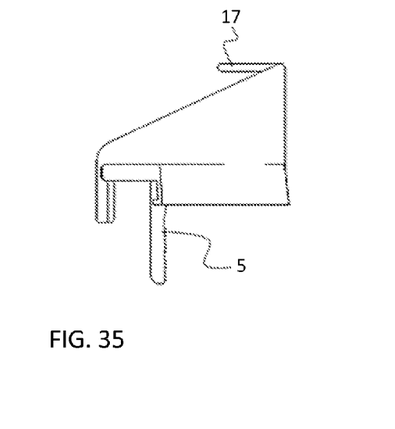
FIG. 35 shows the retainer arrangement of FIG. 31 from the side.
Figure 36:
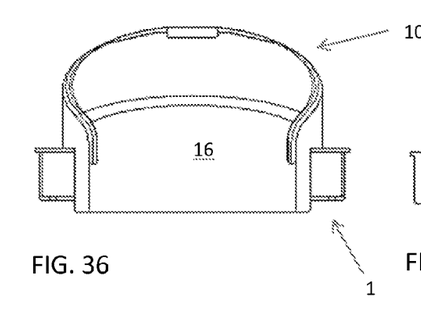
FIG. 36 shows a fifth embodiment of the retainer arrangement according to an embodiment from the front.
Figure 37:
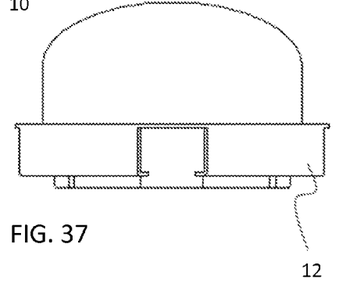
FIG. 37 shows the retainer arrangement of FIG. 36 from the back.
Figure 38:
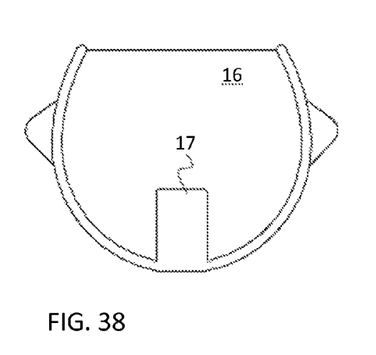
FIG. 38 shows the retainer arrangement of FIG. 36 from the top.
Figure 39:
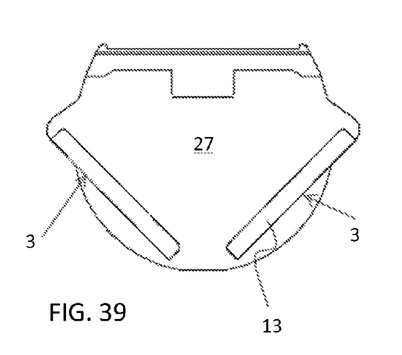
FIG. 39 shows the retainer arrangement of FIG. 36 from below.
Figure 40:
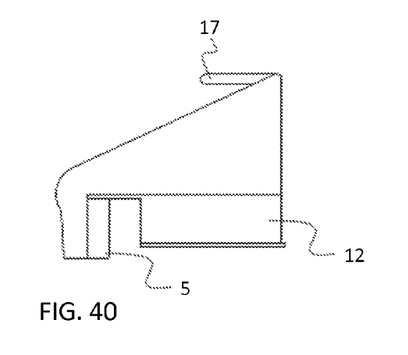
FIG. 40 shows the retainer arrangement of FIG. 36 from the side.

The structure and operation of the retainer arrangement 1 can also be implemented as shown in FIGS. 16 to 25. This type of retainer arrangement comprises in the manner described above a support surface 2 that is equipped with at least two holding means 3. The support surface comprises at least one mounting opening 4, to which a separate locking means 5 can be guided in the manner shown in FIG. 22. In this case, the mounting opening is formed of a notch made on the support surface as shown in FIGS. 18 and 19, for example. With this locking means, the retainer arrangement is locked to the top edge 8 protruding from the wall 7 of the serving dish 6 that is the mounting site, in the manner shown in FIG. 10. In this embodiment, a special spring element 23 is arranged to the support surface 2 on the retainer arrangement to provide a pressure effect against the top surface 11 of the top edge on the serving dish receiving the retainer arrangement, in the manner of the channel 21 described above.

In the embodiment according to FIGS. 16 to 25, the locking means 5 also forms part of the fastening elements 10 of the retainer arrangement. One embodiment of the fastening element is shown in FIGS. 21 to 25, in which the elements receiving the serving utensil comprise a bowl-like part 16 for receiving a ladle and a holding part 17 protruding above it to keep the ladle in place. As in the first embodiment of the retainer arrangement, the fastening elements are in their service position arranged to protrude above the serving dish in relation to its top edge while the locking means 5 is arranged to extend inside the serving dish to settle against its inner surface 15.

In this second embodiment of the retainer arrangement, the fastening elements 10 also settle on the base formed by the support surface 2, on one hand, via the locking means 5 and, on the other, by the interaction of the holder protruding from the support surface and the counter elements in the fastening element. In the present embodiment, by way of example, the holder is formed of an edge 24 on the support surface, to which the claw-like means 25 on the fastening element is arranged to fasten in the manner shown in FIG. 22.

The retainer arrangement 1 can also be formed in such a manner that the fastening element 10 forms part of the support structure 2, while the locking means 5 to be arranged in the mounting opening 4 is a separate piece. Variations of this type are shown in FIGS. 26 to 30, 31 to 35, and 36 to 40. The first one of them, that is, the embodiment of FIGS. 26 to 30, has a retainer arrangement with a support surface 2 equipped with a channel 21 in accordance with the first embodiment to improve the hold between the retainer arrangement and serving dish 6. However, the fastening elements and support surface form one entity that is arranged on the serving dish with the locking means 5 that is guided into the mounting opening 4.

The following embodiment in accordance with FIGS. 31 to 35 differs from the previous by not having a channel in the support surface 2. The staying of the retainer arrangement 1 on the top edge of the serving dish is ensured, on one hand, by the locking means 5 set on the retainer arrangement and, on the other hand, by a cover section 26 connecting the flanges 13 of the holding means. This cover section forms a larger friction surface on the outer corner of the serving dish, thus ensuring that the retainer arrangement remains in place during use.

In the fifth embodiment according to FIGS. 36 to 40, the retainer arrangement 1 is at its simplest. This arrangement comprises fastening elements 10, the bottom surface 27 of which forms the support surface of the arrangement. Holding means 3 equipped with flanges 13 and substantially at right angles to each other extend from the support surface and ensure the keeping in place of the retainer arrangement together with the locking means 5 guided into it.

The above embodiments have in common that the locking means 5 most usually comprises some type of holding surface that is orientated towards the inner surface 15 of the serving dish wall. This type of holding surface is preferably formed of a suitable material accepted for foodstuffs and may be silicone, for example.

The retainer arrangement is most conventionally made entirely of one or more polymers, but may also be made of one or more metals or a combination of one or more polymers and metals.

Figure 15:
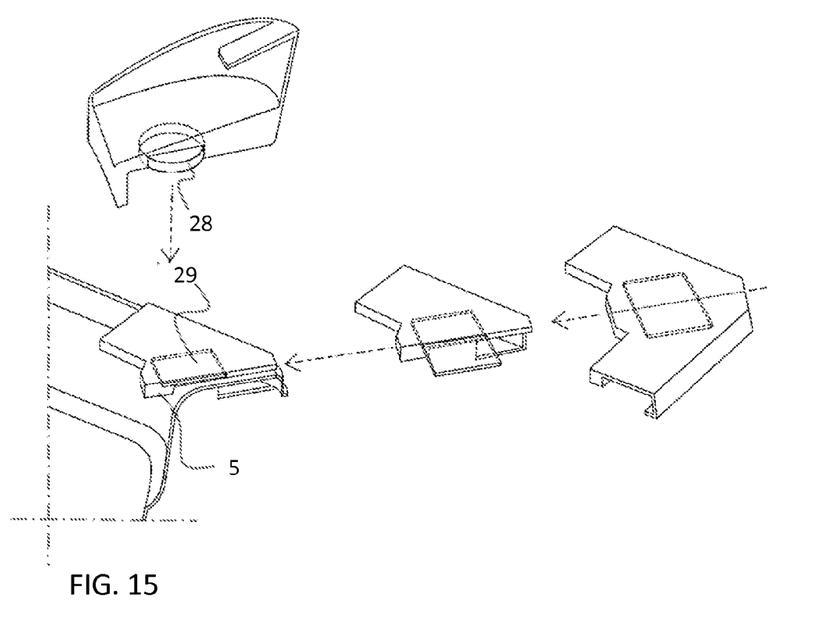
FIG. 15 shows a second embodiment for arranging a fastening element to the retainer arrangement of FIG. 1.
Figure 16:
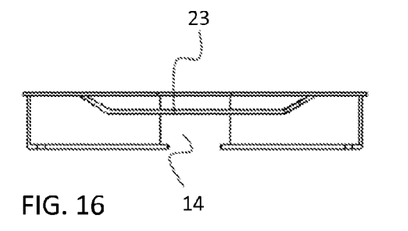
FIG. 16 shows a second embodiment of the retainer arrangement according to an embodiment from the front.
Figure 17:
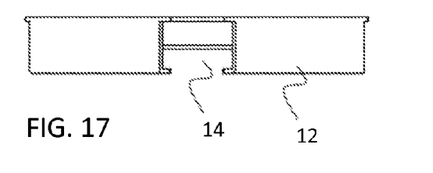
FIG. 17 shows the retainer arrangement of FIG. 15 from the back.

Differing from the above, the fastening elements 10 can also be mounted on the base formed by the support surface 2 of the retainer arrangement 1 by magnetic attachment. This type of embodiment is shown in FIG. 15. It shows a magnet 28 on the fastening element and a counter-piece 29 on the support surface, both being preferably arranged inside pieces formed by injection-moulding. The positions of the magnet and counter-piece can naturally also be reversed.

The locking means on the retainer arrangement can also be made a fixed part of the support surface. This type of embodiment is shown as part of FIG. 15. When pressing the retainer arrangement is place, the support surface and holding means yield enough so that the locking means can be guided past the top surface 11 of the top edge 8 of the serving dish to press against the inner surface 15 of the serving dish in its service position.

It is to be understood that the above description and the related figures are only intended to illustrate the present general solution of a retainer arrangement. The solution is thus not restricted to the embodiments described herein. It should be recognized that different variations and modifications are possible within the scope of the idea defined in the disclosed embodiments.

The invention claimed is:

1. A retainer arrangement for arranging a serving utensil to a top edge protruding from a wall of a serving dish, the retainer arrangement comprising:
    a support element having at least two holding partitions arranged substantially orthogonally to each other and configured to protrude from the support element and to be guidable below the top edge of the serving dish, a main surface of the support element arranged substantially parallel to a top surface of the top edge of the serving dish and configured to contact the top surface; and a fastening element having at least one locking element configured to contact an inner surface of the wall of the serving dish, the fastening element protruding in relation to the top edge of the serving dish and configured to receive the serving utensil to be set on the retainer arrangement.

2. The retainer arrangement as claimed in claim 1, wherein the support element comprises at least one mounting opening configured to receive the at least one locking element, the locking element configured to be guided into the support element.

3. The retainer arrangement as claimed in claim 1, wherein the at least two holding partitions each comprise:
a protrusion extending substantially perpendicularly from the main surface, and
at least one flange parallel to the main surface extending from the protrusion toward the serving dish from the end of the protrusion opposite the main surface.

4. The retainer arrangement as claimed in claim 3, wherein the at least one flange is substantially equal in length to at least one of the at least two holding partitions.

5. The retainer arrangement as claimed in claim 3, wherein the at least one flange comprises a plurality of claws that extend below the top edge of the serving dish.

6. The retainer arrangement as claimed in claim 3, wherein the protrusions of the at least two holding partitions form a blunt angle with the main surface.

7. The retainer arrangement as claimed in claim 1, wherein the support element comprises a channel configured to receive the top edge of the serving dish, the channel arranged on the main surface so that the channel widens in a direction of the top edge and is narrower than the top edge on a section opposite the top edge in order to provide a pressure effect against the top surface of the top edge of the serving dish.

8. The retainer arrangement as claimed in claim 1, wherein the support element comprises a spring element arranged on the main surface, the spring element configured to provide a pressure effect against the top surface of the top edge of the serving dish.

9. The retainer arrangement as claimed in claim 2, wherein the locking element received in the mounting opening forms a part of the fastening element configured to be connected to the main surface.

10. The retainer arrangement as claimed in claim 1, wherein the locking element comprises a gripping surface orientated towards an inner surface of the wall of the serving dish.

11. The retainer arrangement as claimed in claim 1, wherein a composition of the retainer arrangement comprises one or more polymers.

12. The retainer arrangement as claimed in claim 1, wherein a composition of the retainer arrangement comprises one or more metals.

13. The retainer arrangement as claimed in claim 1, wherein a composition of the retainer arrangement comprises a combination of one or more polymers and metals.

14. The retainer arrangement as claimed in claim 1, further comprising a mechanical attachment configured to connect the fastening element to a base formed by the main surface.

15. The retainer arrangement as claimed in claim 1, further comprising a magnetic attachment configured to connect the fastening element to a base formed by the main surface.

* * * * *